June 27, 1961     K. R. BROWN ET AL     2,990,527
ELECTROMAGNETIC PICK-OFF DEVICES
Filed Feb. 16, 1959
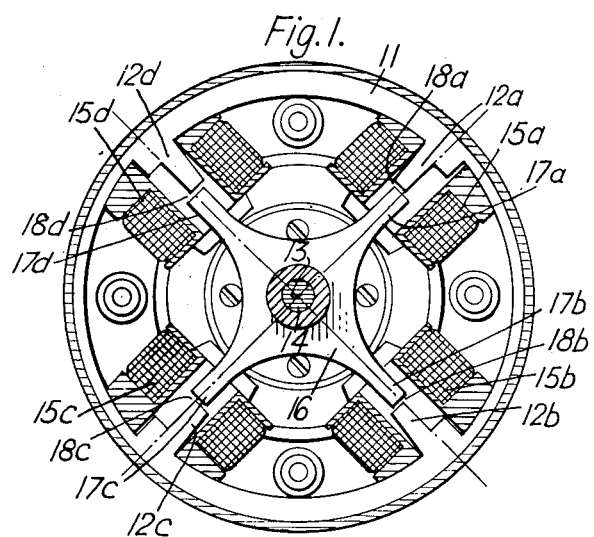
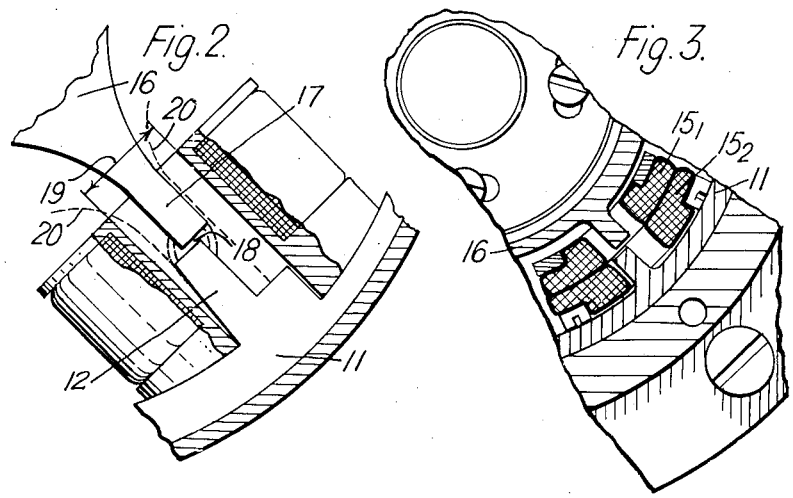
Inventors
KENNETH ROBSON BROWN
GILROY DAWSON
By
Cameron, Kerkam & Sutton
Attorneys

United States Patent Office 2,990,527
Patented June 27, 1961

2,990,527
ELECTROMAGNETIC PICK-OFF DEVICES
Kenneth Robson Brown, Midlothian, and Gilroy Dawson, Edinburgh, Scotland, assignors to Ferranti, Limited, Lancashire, England, a company of Great Britain and Northern Ireland
Filed Feb. 16, 1959, Ser. No. 793,509
Claims priority, application Great Britain Feb. 19, 1958
5 Claims. (Cl. 336—30)

This invention relates to electromagnetic pick-off devices of the type—hereinafter referred to as the type stated—for providing an alternating output voltage which represents by its amplitude and phase (with respect to a source voltage) the magnitude and direction of the angular position of a shaft with respect to a datum position.

Such a pick-off usually includes an unwound rotor secured to the shaft and co-operating with a stator having two or more wound poles. These stator windings are interconnected for alternating current (A.-C.) energisation by the source and from them is obtained an output voltage dependent on the relative inductances of the windings. These inductances are in part determined by the dimensions of the airgaps between the rotor the respective stator poles, which dimensions are dependent on the angular position of the rotor with respect to the stator.

In such pick-offs as hitherto known, the rotor is located beyond one end of each stator winding in a region where the leakage flux—that is, the flux set up by the winding which does link with the rotor—changes rapidly along the winding axis. Thus any displacement of the winding in the direction of this axis substantially modifies the extent of the leakage flux and hence the effective inductance of the winding. The output of the pick-off is thereby disturbed. Such a displacement of the winding may well occur due to its expansion on heating. Distortion due to such displacements is particularly serious where maximum stability of the null position (corresponding to the datum position above referred to) is required.

An object of the present invention is to provide a pick-off of the type stated of enhanced stability in the region of the null position.

Another object is to provide such a pick-off which is inappreciably sensitive to displacement of the stator windings.

In accordance with the present invention, a pick-off device of the type stated includes one or more pairs of wound stator poles associated with an unwound rotor secured to said shaft, each stator pole co-operating with a rotor pole individual to that stator pole, and each stator pole winding extending sufficiently beyond the stator pole towards the rotor axis for the airgap between that stator pole and the co-operating rotor pole to be located at approximately the magnetic centre of the winding so as to be in a region of minimum leakage flux, the inner dimensions of the winding being such as to allow sufficient movement of the rotor.

In the accompanying drawings,

FIGURE 1 shows a section through a pick-off device in accordance with one embodiment of the invention, FIGURE 2 shows part of FIGURE 1 to an enlarged scale and, FIGURE 3 shows a part of a pick-off device in accordance with another embodiment.

In carrying out the invention according to one form by way of example, see FIG. 1, a pick-off of the type stated for highly stable operation in the null region consists of a stator 11 having four poles 12a to 12d. The pair of poles 12a and 12c are diametrically opposite one another with respect to the rotor axis 13, which is also the axis of the shaft 14 of the pick-off. The other pair of poles 12b and 12d are also diametrically opposite one another. The four poles are spaced around axis 13 with a slight departure from exact uniformity which will be indicated later.

Each stator pole has a winding 15a, 15b, etc., as the case may be; the axis of each winding extends radially with respect to the axis 13.

Secured to the shaft 14 of the pick-off is an unwound rotor 16 having four poles 17a to 17d uniformly spaced round rotor axis 13 for co-operation with the four stator poles 12a to 12d respectively. Each rotor pole is elongated in a radial direction and extends towards the co-operating stator pole sufficiently to leave an airgap 18a, 18b, etc., as the case may be, of minimum length between them. The tip of each stator pole and of each rotor pole has an angular span of about seven degrees in planes normal to the rotor axis.

In contrast with pick-offs of the type stated as hitherto known where each winding stops short of the stator pole tip, each winding 15 of a pick-off in accordance with the invention, as shown more clearly in FIG. 2, extends beyond the tip of the stator pole 12 towards the rotor axis, and extends past the tip of the co-operating rotor pole 17 sufficiently for the airgap 18 defined by these tips to be located at approximately the magnetic centre of the winding, that is, approximately half way along the axis of the winding. In other words, each rotor pole extends about half way into the stator pole winding.

The inner dimension 19 of that part of the winding which surrounds the rotor pole is of course made large enough to permit some angular movement of the rotor. Conveniently, the winding is formed so that its inner section is somewhat elongated in the direction of rotor movement to accommodate that movement. Such movement is necessarily restricted by the winding, but a few degrees of movement may easily be allowed and this in practice is quite sufficient for a pick-off designed for accurate null operation.

The four windings 15 are connected to one another in series to form a four-arm bridge network. The bridge is energised at two opposite points by the A.-C. source concerned and the output derived from the other two points in the usual manner for a four-pole pick-off of the type stated.

For the successful operation of the device it is necessary that the rotor can take up a null angular position (corresponding to the datum position) where all four airgaps have the same reluctance and in consequence the bridge is balanced and provides a zero output. It is further necessary that at the least angular movement in either direction from the null position the reluctances of one pair of diametrically opposite airgaps should increase and the reluctances of the other pair decrease. These requirements are satisfied in the present arrangement by slightly displacing the stator poles from the position of exact uniform spacing round the rotor axis. In the arrangement depicted, stator pole 12a is displaced towards the adjacent pole 12d to the extent of half the angular span of the pole in planes normal to the rotor axis. The other two stator poles 12b and 12c are displaced towards one another to the same extent. These positions of the poles are still consistent with pole 12a being exactly diametrically opposite pole 12c, and pole 12b exactly opposite pole 12d. Owing to the smallness of these displacements the stator poles may nevertheless be considered as spaced approximately uniformly round the rotor axis.

In operation, the rotor in its null or datum position as depicted in FIG. 1 is angularly located so that at each pole the stator and rotor pole tips overlap to the same extent. From the above description it will be seen that owing to the displacement of the stator poles this extent is half a pole span. The slightest angular movement of the rotor in one direction—say, clockwise, as depicted—increases the overlap at the two opposite airgaps 18b and 18d and hence decreases their reluctances, and decreases the overlaps at the other two airgaps. Movement counter clockwise increases the overlap at airgaps 18a and 18c and decreases the overlaps at the other gaps. In either case the balance of the bridge is upset and an output of one or other phase is produced as in known arrangements.

During the assembly of the pick-off, the preformed stator windings may conveniently be mounted over the respective stator poles as follows. The rotor is rotated to bring its poles to positions midway between the stator poles. The four windings are temporarily threaded over the four rotor poles, which as will be apparent from the drawing are radially long enough to receive them. The rotor is then rotated to bring its poles into alignment with the stator poles, and the windings are transferred from the rotor poles to the stator poles and there secured in position.

Alternatively, where a shorter rotor pole is preferred, each stator winding 15 may be split in its axial direction into two parts $15_1$ and $15_2$ as shown in FIG. 3. The mounting procedure may then be as described for the long-pole rotor except that when the rotor is displaced, the radially outer winding $15_2$ is mounted onto its stator pole direct whilst only the other winding $15_1$ is threaded over a rotor pole. As the rotor poles need therefore carry only a winding of half the full winding length the poles may be made correspondingly shorter, as will be evident from FIG. 3.

In an alternative embodiment (not shown) the stator poles are spaced exactly uniformly whereas the rotor poles are spaced approximately uniformly—that is, are slightly displaced from exact uniformity to produce the operational requirements above described. In another arrangement (not shown) both the rotor and the stator poles are slightly displaced.

Various other details of the above-described embodiments, such for example as the system of connection of the bridge network, may be modified within the scope of the invention.

It will readily be appreciated that a pick-off in accordance with the invention possesses the important advantage that as each rotor/stator airgap 18 lies at the approximate magnetic centre of the winding it lies in a region of minimum leakage flux, where the rate of change of flux is substantially zero. In consequence, any displacement of the winding in a radial direction with respect to the rotor axis due to expansion or other causes has a minimum effect upon the stability, the device being thus insensitive to such displacements. This will perhaps be more clearly understood from inspection of FIG. 2, in which the nearest boundaries of the leakage flux are indicated at 20. At the magnetic centre of the winding, where the gap 18 is located, these leakage paths are approximately parallel to the axis of the winding. Hence movement of the gap from this position in the radial direction—that is, towards or away from the rotor—does not appreciably change the value of the total flux across the gap. During the initial development stage of manufacture each winding is made adjustable in the radial direction to allow the airgap to be brought to this precise position, which is indicated by the fact that the movement of the winding in either direcion from this position has the minimum effect upon the output of the pick-off. The dimensions of the pick-off as manufactured are such as to locate each winding in the position thus found by experiment. In the arrangement of FIG. 3, only the radially inner windings $15_1$ are made adjustable during the development stage.

A further advantage of the device in accordance with the invention is the increased sensitivity and accuracy which results from the location of the air-gap in the position described.

What we claim is:

1. A pick-off device of the type for providing an alternating output voltage which represents by its amplitude and phase (with respect to a source voltage) the magnitude and direction of the angular position of a shaft with respect to a datum position including one or more pairs of wound stator poles associated with an unwound rotor secured to said shaft and extending in substantially radial directions relative to said shaft, each stator pole co-operating with a radially extending rotor pole individual to that stator pole, and each stator pole winding extending sufficiently beyond the radially inner end of the stator pole towards the rotor axis for the airgap between that stator pole and the co-operating rotor pole to be located at approximately the magnetic centre of the winding so as to be in a region of minimum leakage flux, the inner dimensions of each winding being such as to allow movement of the co-operating rotor pole in a direction normal to the axis of said winding.

2. A device as claimed in claim 1 wherein each rotor pole is long enough radially to carry temporarily the winding of the co-operating stator pole to facilitate assembly.

3. A device as claimed in claim 1 wherein each stator pole winding is split into two parts displaced axially from one another to facilitate assembly.

4. A device as claimed in claim 3 wherein each rotor pole is long enough radially to carry temporarily that part of the split winding of the co-operating stator pole which is nearer the rotor axis.

5. A device as claimed in claim 1 having two such pairs of stator poles, wherein the poles of each pair are diametrically opposite one another with respect to the rotor axis and are so spaced around the rotor axis with respect to the co-operating rotor poles that at the least angular movement of the rotor from a null position (corresponding to said datum position) where the reluctances of all four airgaps are equal, the reluctances of two diametrically-opposite airgaps increase whereas the reluctances of the other two airgaps decrease.

References Cited in the file of this patent

UNITED STATES PATENTS 2,173,039    Muir                 Sept. 12, 1939